United States Patent
Srinivasan et al.

(10) Patent No.: US 11,314,542 B2
(45) Date of Patent: *Apr. 26, 2022

(54) PRESCRIPTIVE ANALYTICS BASED COMPUTE SIZING CORRECTION STACK FOR CLOUD COMPUTING RESOURCE SCHEDULING

(71) Applicant: Accenture Global Solutions Limited, Dublin (IE)

(72) Inventors: Madhan Kumar Srinivasan, Bangalore (IN); Arun Purushothaman, Chennai (IN); Guruprasad PV, Banalore (IN); Michael S. Eisenstein, Seattle, WA (US); Vijay Desai, San Diego, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/933,497

(22) Filed: Jul. 20, 2020

(65) Prior Publication Data
US 2020/0348961 A1  Nov. 5, 2020

Related U.S. Application Data

(63) Continuation of application No. 15/922,650, filed on Mar. 15, 2018, now Pat. No. 10,719,344.

(30) Foreign Application Priority Data

Jan. 3, 2018  (IN) .............................. 201841000310

(51) Int. Cl.
*G06F 9/455* (2018.01)
*G06F 9/48* (2006.01)
*G06F 9/50* (2006.01)

(52) U.S. Cl.
CPC .......... *G06F 9/45558* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 9/4557; G06F 2009/45575;
(Continued)

(56) References Cited

U.S. PATENT DOCUMENTS 5,907,675 A    5/1999  Aahlad
8,336,049 B2  12/2012  Medovich
(Continued)

FOREIGN PATENT DOCUMENTS

WO    WO 2013/158139 A1    10/2013

OTHER PUBLICATIONS

Amazon CloudWatch—Cloud & Network Monitoring Services, https://aws.amazon.com/cloudwatch/?nc1=h_ls, dated Jun. 29, 2017, 5p.
(Continued)

*Primary Examiner* — Charles M Swift
(74) *Attorney, Agent, or Firm* — Crowell & Moring

(57) ABSTRACT

A multi-layer compute sizing correction stack may generate prescriptive compute sizing correction tokens for controlling sizing adjustments for computing resources. The input layer of the compute sizing correction stack may generate cleansed utilization data based on historical utilization data received via network connection. A prescriptive engine layer may generate a compute sizing correction trajectory detailing adjustments to sizing for the computing resources. Based on the compute sizing correction trajectory, the prescriptive engine layer may generate the compute sizing correction tokens that that may be used to control compute sizing adjustments prescriptively.

20 Claims, 4 Drawing Sheets

(52) U.S. Cl.
CPC .............. *G06F 9/48* (2013.01); *G06F 9/4843* (2013.01); *G06F 9/4881* (2013.01); *G06F 9/50* (2013.01); *G06F 9/505* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5072* (2013.01); *G06F 9/5077* (2013.01); *G06F 9/5083* (2013.01); *G06F 2009/4557* (2013.01); *G06F 2009/45575* (2013.01); *G06F 2009/45583* (2013.01)

(58) Field of Classification Search
CPC .............. G06F 2009/45583; G06F 9/48; G06F 9/4843; G06F 9/4881; G06F 9/50; G06F 9/5005; G06F 9/5011; G06F 9/5016; G06F 9/5022; G06F 9/5027; G06F 9/505; G06F 9/5072; G06F 9/5077; G06F 9/5083

See application file for complete search history.

(56) References Cited

U.S. PATENT DOCUMENTS

| | | | |
|---|---|---|---|
| 8,499,066 B1 * | 7/2013 | Zhang | H04L 47/823 709/223 |
| 8,612,599 B2 | 12/2013 | Tung et al. | |
| 8,862,914 B2 | 10/2014 | Kansal et al. | |
| 9,367,340 B2 | 6/2016 | Wang | |
| 10,129,106 B2 | 11/2018 | Cropper et al. | |
| 10,459,757 B1 | 10/2019 | Srinivasan et al. | |
| 10,712,958 B2 | 7/2020 | Srinivasan et al. | |
| 2010/0169253 A1 | 7/2010 | Tan | |
| 2010/0199285 A1 | 9/2010 | Medovich | |
| 2010/0250868 A1 | 9/2010 | Oshins | |
| 2010/0269109 A1 | 10/2010 | Cartales | |
| 2011/0055385 A1 | 3/2011 | Tung et al. | |
| 2011/0302578 A1 | 12/2011 | Isci et al. | |
| 2012/0096165 A1 | 4/2012 | Madduri et al. | |
| 2012/0239739 A1 | 9/2012 | Manglik et al. | |
| 2013/0042123 A1 | 2/2013 | Smith et al. | |
| 2013/0111476 A1 | 5/2013 | Medovich | |
| 2013/0179895 A1 | 7/2013 | Calder et al. | |
| 2013/0247043 A1 | 9/2013 | Bingham et al. | |
| 2014/0058871 A1 | 2/2014 | Marr et al. | |
| 2014/0068609 A1 | 3/2014 | Breitgand et al. | |
| 2014/0089495 A1 | 3/2014 | Akolkar et al. | |
| 2014/0089917 A1 | 3/2014 | Attalla et al. | |
| 2014/0136269 A1 | 5/2014 | Wasser | |
| 2014/0137110 A1 | 5/2014 | Engle et al. | |
| 2014/0351199 A1 | 11/2014 | Madani et al. | |
| 2015/0026108 A1 | 1/2015 | Portegys et al. | |
| 2015/0278061 A1 | 10/2015 | Siciliano et al. | |
| 2015/0288573 A1 | 10/2015 | Baughman et al. | |
| 2015/0309828 A1 | 10/2015 | Shaik et al. | |
| 2015/0331703 A1 | 11/2015 | Kelly et al. | |
| 2016/0094401 A1 | 3/2016 | Anwar et al. | |
| 2016/0094410 A1 | 3/2016 | Anwar et al. | |
| 2016/0232022 A1 | 8/2016 | Kania et al. | |
| 2016/0378519 A1 | 12/2016 | Gaurav et al. | |
| 2017/0046190 A1 | 2/2017 | Sivasubramanian et al. | |
| 2017/0075709 A1 | 3/2017 | Feng et al. | |
| 2017/0242731 A1 | 8/2017 | Xie et al. | |
| 2017/0344400 A1 | 8/2017 | Birke et al. | |
| 2018/0006953 A1 | 1/2018 | Power et al. | |
| 2018/0349168 A1 | 12/2018 | Ahmed | |
| 2019/0079848 A1 | 3/2019 | Srinivasan et al. | |
| 2019/0163517 A1 | 5/2019 | Fontoura et al. | |
| 2019/0179675 A1 | 6/2019 | Srinivasan et al. | |

OTHER PUBLICATIONS

Cloudyn for Enterprise, https://www.cloudyn.com/enterprise/, dated Jun. 30, 2017, 3p.
Examination Report No. 1 for Australian patent application No. 2017261531, dated May 7, 2018, pp. 1-8.
Examination Report No. 1 issued on Australian patent application No. 2018250389 dated Apr. 12, 2019, 6 pages.
Examination Report No. 2 for Australian patent application No. 2018250389, dated Aug. 30, 2019, 3 pages.
Examination Report No. 3 for Australian patent application No. 2018250389, dated Jan. 22, 2020, 5 pages.
Examination Report No. 4 for Australian patent application No. 2018250389, dated Mar. 24, 2020, 2 pages.
Extended European Search Report dated Jun. 4, 2018, pp. 1-8, issued in European application No. 17202112.3, European Patent Office, The Hague, The Netherlands.
Extended Search Report issued on European patent application No. 18203941.2 dated Apr. 25, 2019, 9 pages.
How Do I Stop and Start EC2 Instances at Regular Intervals Using AWS Lambda, https://aws.amazon.com/es/premiumsupport/knowledge-center/start-stop-lambda-cloudwatch/, dated Jun. 29, 2017, 5p.
Husain Bohra, Ata E., et al., *"VMeter: Power Modelling for Virtualized Clouds,"* Department of Computer Science and Engineering, University at Buffalo, State University of New York, NY), aehusain,vipin@buffalo.edu, (2010), pp. 1-8.
Trusted Advisor Best Practices (Checks), https:/aws.amazon.com/es/premiumsupport/trustedadvisor/best-practices/, dated Jun. 29, 2017, 6p.
U.S. Appl. No. 16/219,435, filed Dec. 13, 2018.
U.S. Appl. No. 16/285,539, filed Feb. 26, 2019.
U.S. Appl. No. 16/423,720, filed May 28, 2019.
Xiao, Zhen, et al., *"Dynamic Resource Allocation using Virtual Machines for Cloud Computing Environment,"* IEEE Transactions on Parallel and Distributed Systems, vol. 24:No. 6, (2013), pp. 1107-1117.
Zhang J. et al. "Adaptive predictor integration for system performance prediction" in 2007 IEEE International Parallel and Distributed Processing Symposium, Mar. 26, 2007, pp. 1-10.
EP Examination Report, Communication Pursuant to Article 94(3) EPC, in Europe Application No. 18203941.2, dated Jul. 9, 2021, 7 pages.

* cited by examiner

PRESCRIPTIVE ANALYTICS BASED COMPUTE SIZING CORRECTION STACK FOR CLOUD COMPUTING RESOURCE SCHEDULING

PRIORITY CLAIM

This application is a continuation of and claims priority to U.S. patent application Ser. No. 15/922,650, filed Mar. 15, 2018, issuing as U.S. Pat. No. 10,719,344, entitled Prescriptive Analytics Based Compute Sizing Correction Stack for Cloud Computing Resource Scheduling, which is incorporated by reference in its entirety. U.S. patent application Ser. No. 15/922,650 claims priority to Indian Patent Application No. 201841000310, filed Jan. 3, 2018, entitled Prescriptive Analytics Based Compute Sizing Correction Stack for Cloud Computing Resource Scheduling, which is incorporated by reference in its entirety.

TECHNICAL FIELD

This disclosure relates to cloud computing resource scheduling via a prescriptive analytics based compute sizing correction stack.

BACKGROUND

Rapid advances in communications and storage technologies, driven by immense customer demand, have resulted in widespread adoption of cloud systems for managing large data payloads, distributed computing, and record systems. As one example, modern enterprise systems presently maintain data records many petabytes in size in the cloud. Improvements in tools for cloud resource allocation and consumption prediction will further enhance the capabilities of cloud computing systems.

DETAILED DESCRIPTION

Figure 1:
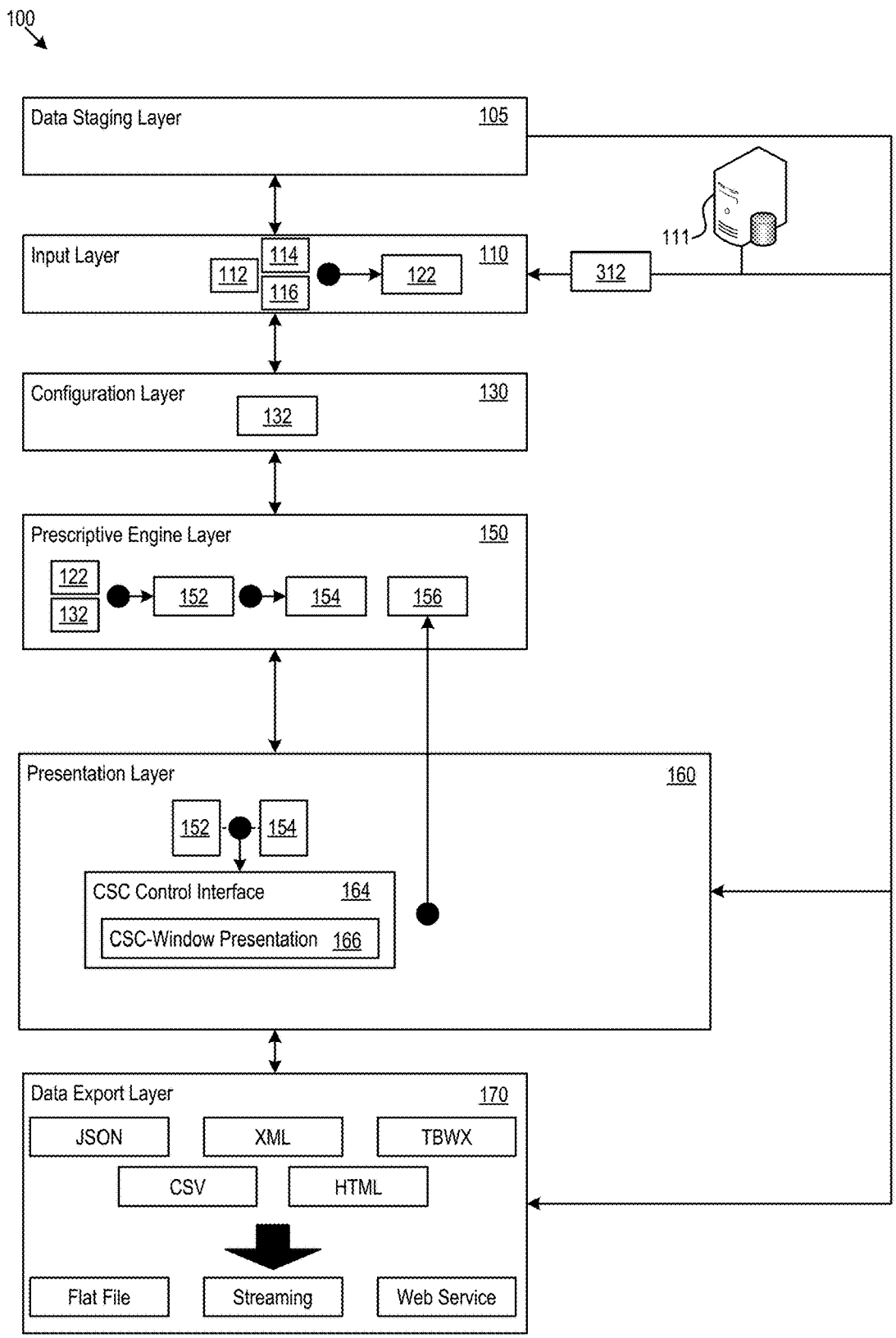
FIG. 1 shows an example multiple-layer compute sizing correction stack.

In cloud computing systems, computing resources such as virtual machines, memory, processor cores, or other computing resources may be scheduled for planned utilization. In some cases, a computing resource may itself constitute an over-provisioning or under provisioning. For example, a provisioned virtual machine may be utilized sporadically or partially, such that a virtual machine corresponding to a smaller compute size could fill the demands on the provisioned virtual machine, where size refers to one or more computing capacities of the computing resource. Conversely, a provisioned virtual machine may be used continually or at capacity and may be unable to fulfill computing requests assigned to it. For example, the virtual machine, in some cases, may reject or be non-responsive to over-capacity requests. Accordingly, an over-sized or under-sized computing resource may lead to performance degradation or inefficient deployment of hardware resources.

Accordingly, increased compute sizing accuracy provides a technical solution to the technical problem of system inefficiency by increasing the utilization and efficiency of cloud computing resources. The compute sizing correction (CSC) stack techniques and architectures described below may be used to prescribe computing resource sizing recommendations based on compute utilization sizing criterion. Further, the determination of the compute sizing correction may rely on data sources such as, utilization data, expenditure report data for resource reservation/activation, computing resource consumption metric data, activation request data, functional grouping data, topological or relationship data, tagging data, or other metadata. Thus, a CSC stack may provide prescriptive analytical sizing correction taking into account resource utilization patterns, computing resource types, computing resource availability, consumption metric data, workload and topological data, geographic data, and/or other data. Thus, the disclosed CSC stack techniques and architectures improve the operation of the underlying hardware by increasing computing efficiency and provide an improvement over existing solutions.

The CSC stack may analyze historical utilization data, tagging data and consumption metric data to predict future utilization and produce prescriptive recommendations. Utilization data, may include, for example, historical data related to usage or activation of cloud computing resources, e.g., resource allocation history, activation/reservation/committed-use history data, expenditure report data for resource reservation/activation/committed-use, processor activity, memory usage history, computing cycles, data throughput, or other utilization metrics, seasonal usage cycles e.g., holiday schedules, daily usage cycles, weekly usage cycles, quarterly usage cycles or other data. Tagging data may include computing resource specific data. For example, tagging data may include data provided by an operator, provisioning or configuration management system, or an analyzed system detailing functional groupings (e.g., project-specific allocations, hardware (including virtualized hardware) marked for a specific purpose, availability zones, operating systems applications, installed software, or other groupings), quality of service requirements, minimum allocations, environmental data, license tags, or other tagging data. Consumption metric data may include computing resource specific cost metrics such as expenditure-per-time or resource-per-time metrics.

FIG. 1 shows an example multiple layer CSC stack 100, which may execute on sizing circuitry making up the hardware underpinning of the CSC stack 100. In this example, the CSC stack 100 includes a data staging layer 105, an input layer 110, a configuration layer 130, a prescriptive engine layer 150, a presentation layer 160, and a data export layer 170. The CSC stack 100 may include a multiple-layer computing structure of hardware and/or software that may provide prescriptive analytical recommendations (e.g., static reservation scheduling for virtual machines or other computing resource activation scheduling) through data analysis.

In some implementations, as discussed below, CRSR Engine—a Cloud Right-Sizing Recommendation Engine developed by Accenture® Bangalore may be operated as the CSC stack 100.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example for the CSC stack 100, the data staging layer 105 may provide the input layer 110 with storage resources to store ingested historical utilization data within a database. Hence, the data staging layer 105 may provide a hardware resource, e.g., memory storage resources, to the input layer 110. Accordingly, the multiple-layer stack architecture of the CSC stack may improve the functioning of the underlying hardware.

Figure 2:
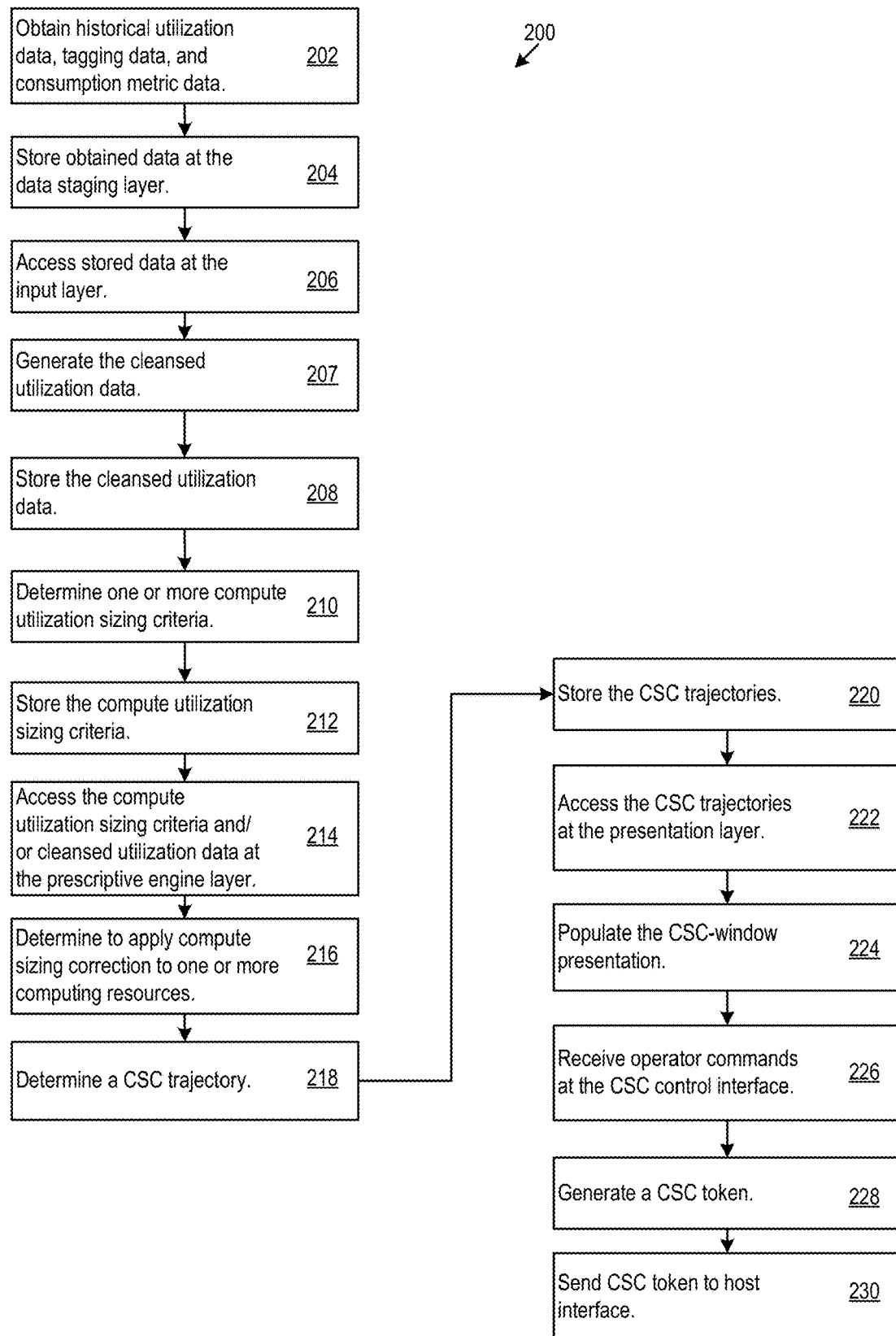
FIG. 2 shows example compute sizing correction stack logic.

In the following, reference is made to FIG. 1 and the corresponding example CSC stack logic (CSCL) 200 in FIG. 2. The logical features of CSCL 200 may be implemented in various orders and combinations. For example, in a first implementation, one or more features may be omitted or reordered with respect to a second implementation. At the input layer 110 of the CSC stack 100, the CSCL 200 may obtain historical utilization data 112, consumption metric data 114, and tagging data 116 (202) and then store the obtained data at the data staging layer 105 (204). In some cases, the historical utilization data 112, consumption metric data 114, and tagging data 116 may be received via communication interfaces (e.g., communication interfaces 312, discussed below). The historical utilization data 112, consumption metric data 114, and tagging data 116 may be accessed at least in part, e.g., via the communication interfaces 312, from data sources 111, which may include, cloud compute utilization databases, cloud expenditure databases, master virtual machine cost databases, committed-use history databases, virtual machine family/template description data, infrastructure/project tags or other data sources. The historical utilization data 112 may be provided by cloud compute utilization databases, cloud expenditure databases, committed-use history databases, or other utilization data sources. The consumption metric data 114 may be provided by cloud expenditure databases, master virtual machine cost databases, virtual machine family/template/platform as a service, description data, or other consumption metric data sources. The tagging data 116 may be provided by virtual machine family/template description data, infrastructure/ project tags or other tagging data sources.

After the historical utilization data 112, consumption metric data 114, and tagging data 116 are obtained and stored, the input layer 110 may access the some or all of the stored data (206) using memory resources passed from the data staging layer 105 (e.g., memory access resources). The input layer 110 may process the historical utilization data 112 to generate a cleansed utilization data 122 for the computing resources (207). For example, the input layer may reformat historical utilization data obtained from multiple sources into a common format for analysis. The common format may be a selected format to which data in other formats are translated. In some cases, the cleansed utilization data 122 may include a time-correlated history and cycle analysis of past computing resource usage to facilitate determination of likely patterns of future usage, e.g., for individual computing resources, computing resources within a functional group, or other groups of computing resources.

In some cases, the techniques and architectures used in conjunction with an activation timetable stack such as that described in U.S. patent application Ser. No. 15/811,339, filed Nov. 13, 2017, entitled Prescriptive Analytics Based Activation Timetable Stack for Cloud Computing Resource Scheduling, which is entirely included herein by reference, may be used to perform or assist in generation of the cleansed utilization data 122. Therein, the input layer of the activation timetable stack may parse historical utilization data, consumption metric data, and tagging data to identify patterns at multiple timescales. The input layer of the activation timetable stack may then generate time-correlated consumption data. In an illustrative scenario of how the CSC stack 100 may utilize the activation timetable stack outputs, the parsing of the historical utilization data, consumption metric data, and tagging data, done by the input layer of the activation timetable stack may be implemented by the input layer 110 of the CSC stack to generate the cleansed utilization data 122 (207).

Additionally or alternatively, to process the stored data 112, 114, 116, the input layer 110 may analyze time components of the stored data 112, 114, 116 to determine time related patterns. For example, the input layer 110 may identify weekly, monthly, holiday, seasonal, or other time cycles present within the stored data 112, 114, 116. Time-independent data, such as, non-conditional functional group assignments, may be applied to all time periods. However, temporal or otherwise dynamic functional groupings may be correlated to corresponding timescales.

To generate the cleansed utilization data 122, the input layer 110 may determine one or more timescales (e.g., timescales including time-invariant contributions) present within the data. For example, the input layer 110 may apply various frequency analyses to the data to determine periodic, aperiodic, and/or time-invariant trends. Additionally or alternatively, the input layer 110 may apply rule-based analyses such as holiday schedules, operational hours, or annual enterprise cycles that may be expressly defined by rules rather than through inferential analysis.

Once the cleansed utilization data 122 is generated, the input layer 110 may store the cleansed utilization data 122, via a database operation at the data staging layer 105 (208). For example, the cleansed utilization data 122 may be stored on storage dedicated to the CSCL 200. Additionally or alternatively, the cleansed utilization data 122 may be stored on a shared database or cloud storage. Accordingly, the data staging layer 105 may further access network resources (e.g., via communication interfaces 312, discussed below) to implement memory resource provision to the other layers. In an example implementation, the CSCL 200 may be defined within a Revolution-R environment. However, other design platforms may be used.

At the configuration layer 130 of the CSC stack 100, the CSCL 200 may determine one or more compute utilization sizing criteria 132 (210). The compute utilization sizing criteria 132 may include threshold values, values for extrema (e.g., minimum, maximum), averages, or other criteria for determining when and how strongly to apply compute sizing correction.

The compute utilization sizing criteria 132 may be supplied via operator input, e.g., via the CSC control interface 164, as discussed below. For example, an operator may select to apply compute sizing correction to computing resources with $95^{th}$ percentile usage below a threshold value (or conversely determine to not compute sizing correction computing resources with $95^{th}$ percentile usage above a minimum threshold value).

Once, the CSCL 200 determines the compute utilization sizing criteria 132, the CSCL 200 may store the compute utilization sizing criteria 132 via operation at the data staging layer 105 (212).

The prescriptive engine layer 150 may access the cleansed utilization data 122 and/or the compute utilization sizing criteria 132 using a memory resource provided by the data staging layer 105 (214). For example, the data staging layer 105 may provide a memory read resource (such as a SQL database read resource) to the prescriptive engine layer 150 to allow access to the cleansed utilization data 122.

Using the cleansed utilization data 122 and/or the compute utilization sizing criteria 132, the CSCL 200, at the prescriptive engine layer 150, may determine to apply compute sizing correction to one or more computing resources (216). The determination may include predicting future utilization based on the time patterns extracted in the cleansed utilization data 122 generated at the input layer (or received, e.g., from an activation timetable stack, at the input layer).

In an illustrative example, the prescriptive engine layer 150 may implement the example routine in Table 1 to determine a CSC trajectory for a computing resource.

TABLE 1

Example Routine for Determination of CSC Trajectory

| | Description |
|---|---|
| Example Routine | Right-Size* = = If $\alpha(t) <= \pi$ OR [$(\alpha(t) > \pi)$ & $(P95(t) < \mu)$] |

$\alpha(t)$: Max utilization value for a time period "t".
$\pi$: Max utilization threshold value (example compute utilization criterion).
$P95(t)$: $95^{th}$ percentile utilization value for the time period "t".
$\mu$: P95 threshold utilization value (example compute utilization criterion).

In some implementations, the CSCL 200 may further determine a CSC trajectory 152 for a computing resource (218). A CSC trajectory 152 may include a target, or other estimated sizing, for a computing resource. The CSC trajectory 152 may further detail one or more CSC cycle adjustments 154 that may indicate intermediate compute sizing correction steps to progress towards the target sizing. The compute sizing correction steps in some cases may correspond to an allowed adjustment within a cycle (e.g., billing period, interval, or other time period). Detailing an allowed adjustment may prevent the CSCL 200 from adjusting a computing resource at a rate that may produce unexpected results. For example, a CSC stack may constrain sizing adjustments to one sizing increment per cycle. However, other adjustment constraints may be used.

In some implementations, CSCL 200 may apply a binary compute sizing correction determination. For example, the CSCL 200 may determine which computing resources will have compute sizing correction applied. Then, the CSCL 200 may prescribe a unitary sizing adjustment (either incrementing the sizing or decrementing the sizing) to each of the determined computing resources. In such a binary compute sizing correction determination, the CSC trajectory corresponds to the unitary increment/decrement and the CSC cycle adjustment 154 also corresponds to the unitary increment/decrement.

In some implementations, to determine the target sizing, the CSCL 200 may determine the sizing for the computing resource that would cause it to meet the compute utilization sizing criteria 132 based on the cleansed utilization data available for the computing resource.

In some cases, the CSCL 200 may further account for static reservation in compute sizing correction determinations. For example, the CSCL 200 may avoid applying sizing corrections to statically reserved computing resources (or computing resources for which static reservation is prescribed or planned). Accordingly, the CSCL 200 may increase sizing corrections (or the magnitude of such corrections). e.g., relative to initial sizing adjustment determinations, on dynamically reserved computing resources to avoid applying compute sizing correction to statically reserved computing resources. Accordingly, the CSCL 200 may reduce or eliminate a determined sizing reduction for a statically reserved computing resource or increase a sizing reduction for a dynamically reserved computing resource when other computing resources in the same functional group are statically reserved. Accordingly, the CSCL 200 may shift computing load to statically reserved computing resources from dynamically reserved computing resources.

In some implementations, the CSCL 200 may identify statically and dynamically reserved computing resources by accessing a reservation matrix, such as that generated by a committed compute reservation stack such as that described in Indian Patent Application No. 201741044406, filed Dec. 11, 2017, entitled Prescriptive Analytics Based Committed Compute Reservation Stack for Cloud Computing Resource Scheduling, which is incorporated by reference in its entirety. The reservation matrix may detail a distribution of statically and dynamically computing resources. In some implementations, the CSCL 200 may exhaust sizing adjustments for dynamically provisioned computing resources before applying sizing adjustment to statically reserved resources. In some implementations, the CSCL 200 may engage in an iterative sizing determination scheme with a committed compute reservation stack. The committed compute reservation stack may designate an initial distribution of static and dynamic computing resources. Then, the CSCL 200 may make sizing adjustments. The committed compute reservation stack may again adjust the distribution and the CSCL 200 may make further sizing adjustments. The iterative adjustment process may continue eventually reaching a steady state distribution and sizing determination.

In some implementations, CSCL 200, at the prescriptive engine layer 150, may alter the CSC trajectories 152 and/or CSC cycle adjustments 154 based on learned preferences from operator command feedback history. For example, the prescriptive engine layer 150 may account for consumption savings patterns within operator comments. For example, some operators may aggressively pursue sizing reductions. Accordingly, the CSCL 200 may preemptively increase prescribed sizing reductions and/or preemptively decrease prescribed sizing increases. Conversely, an operator may demonstrate a reluctant to pursue sizing reductions and the prescriptive engine layer may adjust its prescriptions in the opposite direction. In some cases, operators may demonstrate functional group specific preferences. For example, operators may resist sizing adjustments to specific functional groups, while freely accepting prescriptions for sizing in other functional groups. Accordingly, the prescriptive engine layer 150 may apply machine learning to identify such patterns within operator commands and preemptively adjust the prescriptions produced to more closely match operator preferences.

In some implementations, CSC trajectories and/or CSC cycle adjustments 154 may involve sizing adjustments that port computing resources across services, vendors, hardware platforms, or other characteristics. The CSCL 200 may apply rules to ensure the preservation of selected characteristics, e.g., operating system, region, security, networking throughput, or other characteristics, of the computing resources across such transactions. For example, when porting across vendors to implement a sizing adjustment, the CSCL 200 may ensure that the operating system used by the replacement computing resource is the same as that before the transition. The CSCL 200 may also disallow certain transitions. For example, some implementations may disallow sizing transitions involving vendor changes.

Referring again to FIGS. 1 and 2, the CSCL 200 may store the CSC trajectories 152 for the computing resources, via interaction with the data staging layer (220).

The presentation layer 160 may then access the CSC trajectories for the computing resources (222). The presentation layer 160 may merge the CSC trajectories and CSC cycle adjustments with consumption metric data to generate consumption saving data corresponding to the CSC trajectories and CSC cycle adjustments. The presentation layer 160 may sort the computing resources according to consumption savings, functional groups, sizing adjustment magnitude, or other variables. The presentation layer 160 may generate the CSC control interface 164 and populate the CSC-window presentation 166 with the CSC trajectories and CSC cycle adjustments and accompanying data and options (224).

The CSC control interface may receive operator commands, e.g., accepting and/or rejecting prescribed sizing adjustments (226). The CSCL 200 may incorporate the operator commands, and, at the prescriptive engine layer 150, generate a CSC token 156 (228). The CSC token 156 may include commands, scripts, or other code to cause host interfaces for controlling the respective computing resources to implement the sizing adjustments. For example, services such as Amazon® Web Services (AWS), Google® Compute Engine, Microsoft® Azure, or other cloud computing services, may maintain host interfaces (e.g., web interfaces, application programming interfaces, or other interfaces) by which clients may define operation of the computing resources. The CSCL 200 may also use a scheduling proxy system that uses the CSC trajectory data, CSC cycle adjustment data, and operator command data to maintain schedules, calling the service provider's application programming interfaces, e.g., by sending a CSC token, for each sizing adjustment control action defined by the schedules. The CSCL 200 may use the communication interfaces 312 to send the CSC tokens to the host interfaces (230).

In an illustrative example scenario, the CSCL 200 may implement the example routine in Table 2 to generate a CSC token starting from data received at the input layer 110.

TABLE 2

Example Routine for Determination of CSC Token

Description

| | |
|---|---|
| Ex-<br>ample<br>Rou-<br>tine | Input: Utilization database (Db), Billing Db, Cost Db, Committed Compute (CC) Purchase Db<br>Output: Sizing Adjustment<br>Step1: Load the input files<br>Step2: Cleanse the data<br>   Step2a: Select the required variables for analysis<br>   Step2b: Rename the variables<br>   Step2c: Format the variables (date, numeric and string)<br>Step3: Selecting the maximum utilization<br>   Step3a: for each resource id (1, n) sort utilization value by date and value<br>   Step3b: for each resource id (1, n) select maximum value for each hour<br>Step4: Filtering billing data for EC2 instances<br>   Step4a: Select for "Box-Usage" under "Usage Type"<br>Step5: Merge Utilization, Billing, Cost Files and CC purchase history<br>   Step5a: Merge Utilization and Billing files by resource id<br>   Step5b: Merge the output of Step5a with the Cost file (to extract the information of down-sized recommendation VM cost)<br>   Step5c: Merge CC purchase history to extract the number of CC coupons per VM type<br>Step6: Calculating the 95$^{th}$ percentile utilization value<br>   Step6a: Calculate the 95$^{th}$ percentile value for each resource id (1, n) |

TABLE 2-continued

Example Routine for Determination of CSC Token

Description

Step7: Recommendation Flag generation
   Step7a: Right-Size = = If α(t) <= π OR [(α(t) > π) & (P95(t) < μ) where,
     α(t) = maximum utilization value for the given time-period "t"
     π = maximum utilization threshold value
     P95(t) = 95$^{th}$ percentile utilization value for the given time-period "t"
     μ = P95 threshold utilization value
Step8: Calculate the "potential savings" (if the Right-Size (RS) recommendations are accepted)
   Step8a: Potential Savings = On Demand Cost − Down-size machine Cost
Step9: Remove the duplicate records and generate the recommendations for each resource id
Step10: RS CC computation
   Step10a: Sort the resource id's by VM type, RS recommendation ≠ Right-size and potential savings by ascending order
   Step10b: Exhaust the existing Reserved instances in the order as above
   Step10c: Remaining RS recommendations represent the RS potential savings
Step11: Binning the resource id's based on "potential savings"
   Step 11a: Bin = 'High' if savings <= 65%, 'Medium' if 65% <= savings <= 85%, 'Low' if 85% <= savings
Step12: Generate the final output In some cases, the CSCL 200 may initiate deployment via the data export layer 170. The data export layer 170 may format the reservation matrix in one or more formats for transfer. For example the data export layer 170 may support format translation to java script object notation (JSON), eXtensible markup language (XML), comma separated value (CSV), Tableau Workbook (TBWX), hyper-text markup language (HTML) or other formats. The data export layer 170 may also support transfer of the reservation matrix in one or more states, such as flat file transfers, streaming transfers, web service access, internet protocol transfers, or other transfers.

Additionally or alternatively, the CSCL 200 may initiate deployment via the prescriptive engine layer 150 through direct transfer, direct network access, or other non-export transfer.

Figure 3:
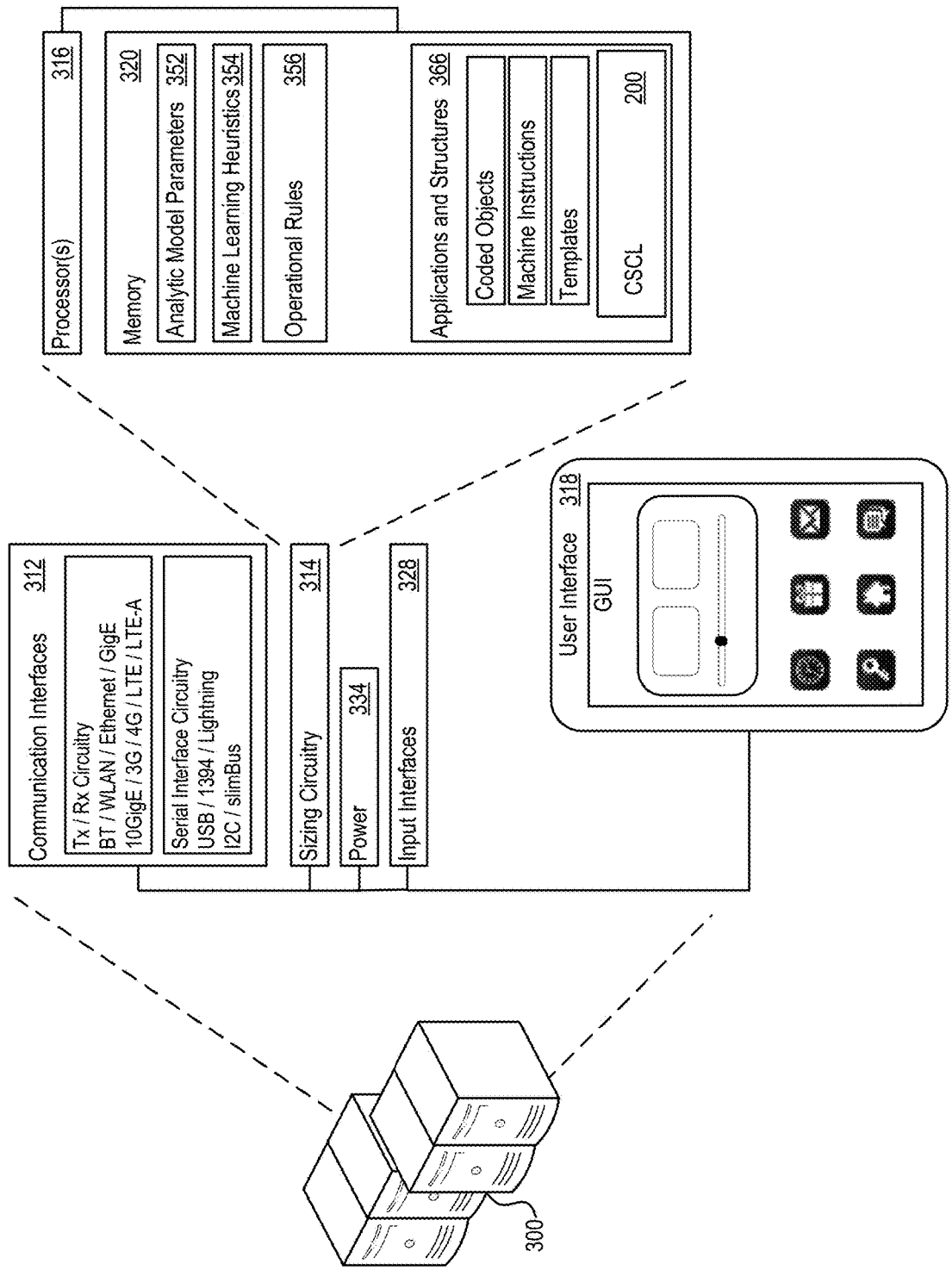
FIG. 3 shows an example specific execution environment for the compute sizing correction stack of FIG. 1.

FIG. 3 shows an example specific execution environment 300 for the CSC stack 100 described above. The execution environment 300 may include sizing circuitry 314 to support execution of the multiple layers of CSC stack 100 described above. The system logic may include processors 316, memory 320, and/or other circuitry.

The memory 320 may include analytic model parameters 352, machine learning heuristics 354, and operational rules 356. The memory 320 may further include applications and structures 366, for example, coded objects, machine instructions, templates, or other structures to support cleansed utilization data generation or other tasks described above. The applications and structures may implement the CSCL 200.

The execution environment 300 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces 312 may also include serial interfaces, such as universal serial bus (USB), serial ATA, IEEE 1394, lighting port, I$^2$C, slimBus, or other serial interfaces. The communication interfaces 312 may be used to support and/or implement remote operation of the CSC control interface 164. The execution environment 300 may include power functions 334 and various input interfaces 328. The execution environment may also include a user interface 318 that may include human-to-machine interface devices and/or graphical user interfaces (GUI). The user interface 318 may be used to support and/or implement local operation of the CSC control interface 164. In various implementations, the sizing circuitry 314 may be distributed over one or more physical servers, be implemented as one or more virtual machines, be implemented in container environments such as Cloud Foundry or Docker, and/or be implemented in Serverless (functions as-a-Service) environments.

In some cases, the execution environment 300 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example, the CSC stack 100, of the execution environment onto the hardware resources. In some cases, a manifest may be stored as a preference file such as a YAML (yet another mark-up language), JSON, or other preference file type.

Figure 4:
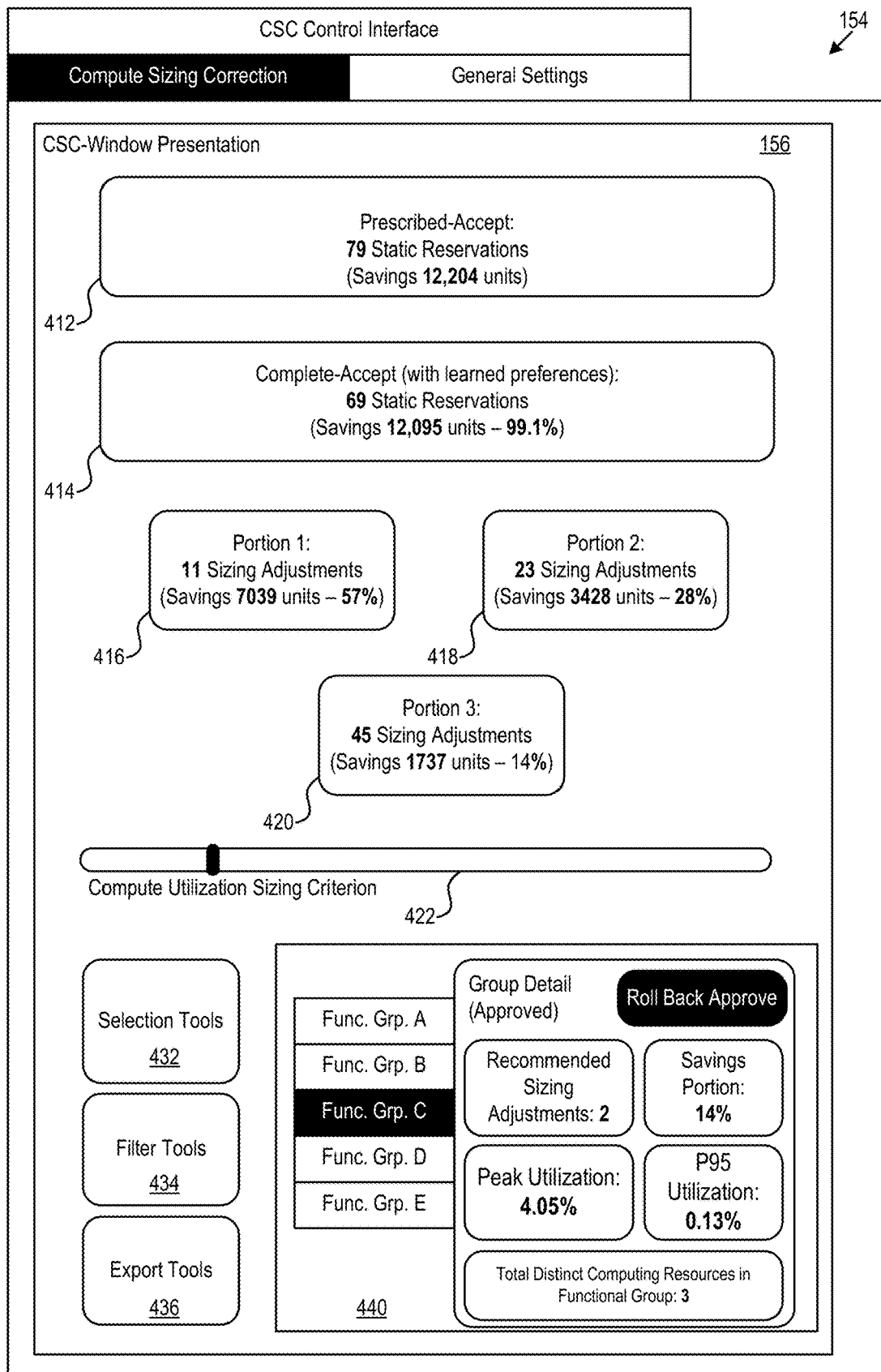
FIG. 4 shows an example compute sizing correction control interface.

Referring now to FIG. 4, an example CSC control interface 164 is shown. The CSC control interface 164 includes an example CSC-window presentation 166 as discussed above. The CSC-window presentation 166 may include multiple selectable options 412, 414, 416, 418, 420, 422 and data regarding the CSC trajectories and CSC cycle adjustments before and after alteration to accommodate the learned preferences of the operator. In this example scenario, the selectable options may include a prescribed-accept option 412 to implement some or all of the prescribed sizing adjustments as a group without alteration based on learned preferences, a complete-accept option 414 to implement the sizing adjustments with alterations based on learned preferences, options 416, 418, 420 to implement augments to selected subsets of the computing resources, option 422 to adjust preferences (e.g., thresholds, extrema, or other compute utilization sizing criteria) and re-run the routine at the prescriptive engine layer 150, or other selectable options to control the eventual CSC token output.

Additionally or alternatively, the CSC-window presentation 166 may include selection and filter tools 432, 434 to support granular manipulation of the sizing adjustments, e.g., by computing resource, by functional group, resource region, operating system, or other granular manipulation. The CSC-window presentation 166 may also include export tools 436 for management of data export layer 170 operations.

In some implementations, the CSC-window presentation 166 may include a functional group detail panel 440 for management of group-level selectable options such as group level approvals of static reservations. Additionally or alternatively, the functional group detail panel 440 may display group-level information regarding static reservations. Functional group detail panel 440 may also provide an option to roll back previously approved static reservations.

In the example, shown in FIG. 4, the options 416, 418, 420 allow for manipulation of selected subsets of the computing resources. For example, as shown the example routine in table two, the sizing adjustments may be "binned" into consumption savings classes. For example, "high", "medium", and "low" consumption savings bins may allow the operator to select specific groups of sizing adjustments. The options 416, 418, 420 show the respective portions of the total consumption savings that may be achieved by adjusting each specific subset of the computing resources. In the example, the first subset option 416 provides the greatest marginal consumption savings, while the options 418, 420 provide successively smaller marginal consumption savings.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above.

A1 In an example, a system includes: network interface circuitry configured to: receive historical utilization data for a selected virtual machine; receive consumption metric data for the selected virtual machine; send a compute sizing correction (CSC) token to a host interface configured to control requisition for at least the selected virtual machine; sizing circuitry in data communication with the network interface circuitry, the sizing circuitry configured to execute a CSC stack, the CSC stack including: a data staging layer; an input layer; a configuration layer; and a prescriptive engine layer; the CSC stack executable to: obtain, via the input layer, the historical utilization data, and the consumption metric data; process, at the input layer, the historical utilization data to generate cleansed utilization data; store, at the data staging layer, the cleansed utilization data, and the consumption metric data; determine, at the configuration layer, a compute utilization sizing criterion; store, at the data staging layer, the a compute utilization sizing criterion; access, at the prescriptive engine layer, the cleansed utilization data and the compute utilization sizing criterion via a memory resource provided by the data staging layer; based on the cleansed utilization data and the compute utilization sizing criterion, determine, at the prescriptive engine layer, a CSC trajectory for the selected virtual machine; based on the CSC trajectory, determine a CSC cycle adjustment for the selected virtual machine; based on the CSC cycle adjustment, generate the CSC token.

A2 The system of example A1, where the CSC stack further includes a presentation layer configured to generate CSC-window presentation within a CSC control interface.

A3 The system of example A1 or A2, where the CSC stack is configured to further determine the CSC token based on a feedback history generated using previous command inputs from a CSC control interface generated at a presentation layer of the CSC stack.

A4 The system of any of claims A1-A4, where the CSC-window presentation includes a selectable option to implement the CSC cycle adjustment, the CSC trajectory, or both.

A5 The system of any of examples A2-A4, where the CSC cycle adjustment is grouped within the CSC-window presentation with other CSC cycle adjustments corresponding to consumption savings within a pre-defined range.

A6 The system of any of examples A2-A5, where the CSC-window presentation includes a summary table detailing CSC cycle adjustments for multiple virtual machines.

A7 The system of any of examples A2-A6, where the CSC-window presentation includes an option to reject one or more CSC cycle adjustments.

A8 The system of any of examples A1-A7, where the CSC stack is configured to receive, at the input layer, the historical utilization data from an activation timetable stack.

A9 The system of any of examples A1-A8, where the CSC stack is configured to receive, at the input layer, a reservation matrix detailing a static reservation for specific virtual machine.

A10 The system of example A9, where the CSC stack is further configured to: decrease a reduction in sizing for the selected virtual machine when the selected and specific virtual machines include the same virtual machine; and increase a reduction in sizing when the selected virtual machine is different from the specific virtual machine but in a same functional grouping as the specific virtual machine.

A11 The system of example A10, where the CSC stack is further configured to decrease a reduction in sizing for the selected virtual machine by rejecting the CSC trajectory for the selected virtual machine.

A12 The system of any of examples A1-A11, where the CSC token is configured to alter a compute capability for the selected virtual machine while preserving a selected operating system, region, networking throughput, or any combination thereof for the selected virtual machine.

A13 The system of any of examples A1-A12, where the CSC token, when sent to the host interface, causes the host interface to implement the CSC cycle adjustment.

B1 In an example, a method includes: at network interface circuitry: receiving historical utilization data for a selected virtual machine; and receiving consumption metric data for the selected virtual machine; at sizing circuitry in data communication with the network interface circuitry, the sizing executing a compute sizing correction (CSC) stack: obtaining, via an input layer of the CSC stack, the historical utilization data, and the consumption metric data; processing, at the input layer, the historical utilization data to generate cleansed utilization data; storing, at a data staging layer of the CSC stack, the cleansed utilization data, and the consumption metric data; determining, at a configuration layer of the CSC stack, a compute utilization sizing criterion; and storing, at the data staging layer, the a compute utilization sizing criterion; at a prescriptive engine layer of the CSC stack: accessing the cleansed utilization data and the compute utilization sizing criterion via a memory resource provided by the data staging layer; based on the cleansed utilization data and the compute utilization sizing criterion, determining, at the prescriptive engine layer, a CSC trajectory for the selected virtual machine; based on to the CSC trajectory, determining a CSC cycle adjustment for the selected virtual machine; and based on the CSC cycle adjustment, generating a CSC token; and sending, via network interface circuitry, the CSC token to a host interface configured to control requisition for at least the selected virtual machine.

B2 The method of example B1, further including generating, at a presentation layer of the CSC stack, a CSC-window presentation within a CSC control interface.

B3 The method of example B2, where determining the CSC token is further based on a feedback history generated using previous command inputs from the CSC control interface.

B4 The method of example B2 or B3, where the CSC-window presentation includes a selectable option to implement the CSC cycle adjustment, the CSC trajectory, or both.

B5 The method of any of examples B1-B4, where the CSC token causes the host interface to implement the CSC cycle adjustment.

C1 In an example, a product includes: machine-readable media other than a transitory signal; and instructions stored on the machine-readable media, the instructions configured to, when executed, cause a machine to: at network interface circuitry: receive historical utilization data for a selected virtual machine; and receive consumption metric data for the selected virtual machine; at sizing circuitry in data communication with the network interface circuitry, the sizing executing a compute sizing correction (CSC) stack: obtain, via an input layer of the CSC stack, the historical utilization data, and the consumption metric data; process, at the input layer, the historical utilization data to generate cleansed utilization data; store, at a data staging layer of the CSC stack, the cleansed utilization data, and the consumption metric data; determine, at a configuration layer of the CSC stack, a compute utilization sizing criterion; and store, at the data staging layer, the a compute utilization sizing criterion; at a prescriptive engine layer of the CSC stack: access the cleansed utilization data and the compute utilization sizing criterion via a memory resource provided by the data staging layer; based on the cleansed utilization data and the compute utilization sizing criterion, determine, at the prescriptive engine layer, a CSC trajectory for the selected virtual machine; based on to the CSC trajectory, determine a CSC cycle adjustment for the selected virtual machine; and based on the CSC cycle adjustment, generate a CSC token; and send, via network interface circuitry, the CSC token to a host interface configured to control requisition for at least the selected virtual machine to cause the host interface to implement the CSC cycle adjustment.

C2 The product of example C1, where the instructions are further configured to cause the machine to receive, at the input layer, a reservation matrix detailing a static reservation for specific virtual machine.

C3 The product of example C2, where the instructions are further configured to cause the machine to: decrease a reduction in sizing for the selected virtual machine when the selected and specific virtual machines include the same virtual machine; and increase a reduction in sizing when the selected virtual machine is different from the specific virtual machine but in a same functional grouping as the specific virtual machine.

C4 The product of example C3, selected virtual machine by rejecting the CSC trajectory for the selected virtual machine.

D1 A method implemented by operation of a system of any of examples A1-A13.

E1 A product comprising instructions stored on a machine readable medium, the instructions configured to cause a machine to implement the method of example D1.

Various implementations have been specifically described. However, many other implementations are also possible.

What is claimed is:

1. A system including:
   network interface circuitry; and
   sizing circuitry in data communication with the network interface circuitry, the sizing circuitry configured to:
     at a presentation layer of a compute sizing correction (CSC) stack and via the network interface circuitry, cause generation of CSC control interface at a remote terminal by:
       sending multiple CSC cycle adjustments for a virtual machine, the CSC cycle adjustments detailing corrections to virtual machine sizing for a cycle over which the system forgoes additional sizing correction,
         the multiple CSC adjustments including multiple groups, the multiple groups including:
           a utilization-analysis group with a first CSC adjustment for the virtual machine, the utilization-analysis group omitting a command-history-feedback-based alteration to analysis-derived CSC adjustments;
           a feedback group with a second CSC adjustment the virtual machine the feedback group including command-history-feedback-based alteration to analysis-derived CSC adjustments;
         the multiple CSC adjustments each including:
           a CSC trajectory indicating a direction of correction relative to a current sizing; and
           a unitary step adjustment corresponding to an adjustment by a single pre-defined increment for the virtual machine, determine a CSC cycle adjustment for the virtual machine;
     at a prescriptive engine layer of the CSC stack:
       receive, a command input based on operator interaction with the CSC control interface, the command input indicating a selected group from among the multiple groups;
       generate a CSC token, the CSC token including the CSC adjustments of the selected group; and
       cause the network interface circuitry to send the CSC token to a host interface, the host interface configured to control requisition for the virtual machine.

2. The system of claim 1, where the sizing circuitry is further configured to, at the prescriptive engine layer of the CSC stack, alter the second CSC adjustment for the virtual machine based on the CSC adjustments of the selected group.

3. The system of claim 1, where the sizing circuitry is further configured to:
   at an input layer of the CSC stack, obtain a historical utilization data for the virtual machine and process the historical utilization data to generate cleansed utilization data;
   at a configuration layer of the CSC stack, determine a compute utilization sizing criterion; and
   at the prescriptive engine layer, determine a CSC trajectory of an analysis-derived CSC adjustment for the virtual machine based on the cleansed utilization data and the compute utilization sizing criterion.

4. The system of claim 3, where the sizing circuitry is configured to, at the input layer, parse the historical utilization data to identify patterns for one or more timescales for generation of the cleansed utilization data.

5. The system of claim 3, where the sizing circuitry is configured to, at the input layer, receive the historical utilization data from an activation timetable stack.

6. The system of claim 3, the sizing circuitry is configured to, at the prescriptive engine layer,
   determine a maximum utilization value for a specific time period from the cleansed utilization data;
   determine a percentile utilization value for the specific time period from the cleansed utilization data; and
   generate the CSC trajectory of the analysis-derived CSC adjustment based on the maximum utilization value, the percentile utilization value, and the compute utilization sizing criterion.

7. The system of claim 1, where the sizing circuitry is configured to, at the presentation layer, merge the multiple CSC adjustments with consumption metric data to generate consumption saving data corresponding to the multiple CSC adjustments.

8. The system of claim 1, where the sizing circuitry is further configured to:
   receive a reservation matrix detailing virtual machines with static reservation; and
   decrease a sizing reduction for the virtual machine in response to the virtual machine being present in the reservation matrix.

9. The system of claim 1, where the sizing circuitry is further configured to:
   receive a reservation matrix detailing virtual machines with static reservation in a functional group; and
   increase a sizing reduction for the virtual machine in response to the reservation matrix being absent from the reservation matrix but in the functional group.

10. The system of claim 1, where the sizing circuitry is further configured to, at the presentation layer, generate a CSC-window presentation within the CSC control interface; the CSC-window presentation includes a selectable option for the first CSC adjustment and the second CSC adjustment.

11. The system of claim 10, where the CSC-window presentation includes an option to reject one or more CSC adjustments in the selected group.

12. The system of claim 10, where the CSC-window presentation includes a summary table detailing CSC adjustments for the virtual machine.

13. A method including:
generating, at a presentation layer of a compute sizing correction (CSC) stack and via a network interface circuitry, a CSC control interface at a remote terminal by:
sending multiple CSC adjustments for a virtual machine, the CSC adjustments detailing corrections to virtual machine sizing for a cycle over which additional sizing correction being forgone,
the multiple CSC adjustments each including:
a CSC trajectory indicating a direction of correction relative to a current sizing; and
a unitary step adjustment corresponding to an adjustment by a single pre-defined increment for the virtual machine, determine a CSC cycle adjustment for the virtual machine;
the multiple CSC adjustments including multiple groups for the virtual machine, the multiple groups including:
a utilization-analysis group omitting a command-history-feedback-based alteration to analysis-derived CSC adjustments;
a feedback group applying command-history-feedback-based alteration to analysis-derived CSC adjustments;
receiving, at a prescriptive engine layer of the CSC stack, a command input based on operator interaction with the CSC control interface, the command input indicating a selected group from the multiple groups;
generating, at the prescriptive engine layer, a CSC token, the CSC token including the CSC adjustments of the selected group; and
causing, at the prescriptive engine layer, the network interface circuitry to send the CSC token to a host interface, the host interface configured to control requisition for the virtual machine.

14. The method of claim 13, where the CSC token causes the host interface to perform the CSC adjustments of the selected group on the virtual machine to alter a compute capability of the virtual machine.

15. The method of claim 13, where the method further includes, at the presentation layer, generating CSC-window presentation within the CSC control interface, the CSC-window presentation includes a selectable option to implement a CSC adjustment in the selected group.

16. The method of claim 15, where the CSC-window presentation includes an option to reject one or more CSC adjustments in the selected group.

17. A product including:
non-transitory machine-readable media; and
instructions stored on the machine-readable media, the instructions configured to, when executed, cause a machine to:
generate, via a network interface circuitry, a CSC control interface at a remote terminal by:
sending multiple CSC cycle adjustments for a virtual machine, the CSC cycle adjustments detailing corrections to virtual machine sizing for a cycle over which additional sizing correction being forgone,
the multiple CSC adjustments including multiple groups, the multiple groups including:
a utilization-analysis group with a first CSC adjustment for the virtual machine, the utilization-analysis group omitting a command-history-feedback-based alteration to analysis-derived CSC adjustments;
a feedback group with a second CSC adjustment the virtual machine the feedback group including command-history-feedback-based alteration to analysis-derived CSC adjustments;
the multiple CSC adjustments each including:
a CSC trajectory indicating a direction of correction relative to a current sizing; and
a unitary step adjustment corresponding to an adjustment by a single pre-defined increment for the virtual machine, determine a CSC cycle adjustment for the virtual machine;
in response to receiving a selected group from the multiple groups via the CSC control interface, generate a CSC token including the CSC adjustments of the selected group; and
cause the network interface circuitry to send the CSC token to a host interface, the host interface configured to control requisition for the virtual machine.

18. The product of claim 17, where the instructions are configured to cause the machine to alter the second CSC adjustment for the virtual machine based on the CSC adjustments of the selected group.

19. The product of claim 17, where the instructions are configured to cause the machine to:
receive a reservation matrix detailing virtual machines with static reservation; and
decrease a sizing reduction for the virtual machine in response to the virtual machine being present in the reservation matrix.

20. The product of claim 17, where the instructions are configured to cause the machine to:
receive a reservation matrix detailing virtual machines with static reservation in a functional group; and
increase a sizing reduction for the virtual machine in response to the reservation matrix being absent from the reservation matrix but in the functional group.

* * * * *